(12) United States Patent  (10) Patent No.: US 7,217,455 B2
Valdez  (45) Date of Patent: May 15, 2007

(54) WEATHERSTRIP TAPE AND METHOD FOR PRODUCING THE SAME

(75) Inventor: Benito Valdez, Grevenbroich (DE)

(73) Assignee: 3M Innovative Properties Company, St. Paul, MN (US)

( * ) Notice: Subject to any disclaimer, the term of this patent is extended or adjusted under 35 U.S.C. 154(b) by 208 days.

(21) Appl. No.: 10/477,567

(22) PCT Filed: May 20, 2002

(86) PCT No.: PCT/US02/16134

§ 371 (c)(1),
(2), (4) Date: Nov. 10, 2003

(87) PCT Pub. No.: WO02/097000

PCT Pub. Date: Dec. 5, 2002

(65) Prior Publication Data

US 2004/0219356 A1 Nov. 4, 2004

(30) Foreign Application Priority Data

May 30, 2001 (EP) .................................. 01112836

(51) Int. Cl.
*B32B 7/12* (2006.01)
(52) U.S. Cl. .................. 428/343; 428/40.1; 428/317.3; 428/317.7; 428/355 AC; 427/208.2; 427/208.4; 427/208.8
(58) Field of Classification Search ................ 428/343, 428/355 AC, 40.1, 317.3, 317.7; 427/208.2, 427/208.4, 208.8
See application file for complete search history.

(56) References Cited

U.S. PATENT DOCUMENTS

| RE24,906 E | * | 12/1960 | Ulrich ..................... 526/328.5 |
|---|---|---|---|
| 3,615,972 A | | 10/1971 | Morehouse, Jr. et al. |
| 3,639,134 A | | 2/1972 | Stegmeier et al. |
| 4,075,238 A | | 2/1978 | Mark et al. |
| 4,181,752 A | | 1/1980 | Martens et al. |
| 4,287,308 A | | 9/1981 | Nakayama et al. |
| 4,329,384 A | | 5/1982 | Vesley et al. |
| 4,330,590 A | | 5/1982 | Vesley |
| 4,391,687 A | | 7/1983 | Vesley |
| 4,415,615 A | | 11/1983 | Esmay et al. |
| 4,563,388 A | | 1/1986 | Bonk et al. |
| 4,710,536 A | | 12/1987 | Klingen et al. |
| 4,749,590 A | | 6/1988 | Klingen et al. |
| 4,855,170 A | | 8/1989 | Darvell et al. |
| 5,639,546 A | | 6/1997 | Bilkadi |
| 5,905,099 A | | 5/1999 | Everaerts et al. |
| 2006/0003178 A1 | * | 1/2006 | Strobel et al. .............. 428/523 |

FOREIGN PATENT DOCUMENTS

| EP | 0384598 B | 12/1993 |
|---|---|---|
| EP | 0679123 B | 11/1995 |
| WO | WO 99/29793 | 6/1999 |

OTHER PUBLICATIONS

Development of Poly(propylene) Surface Topography During Corona Treatment; Viv Jones et al; Corporate Research Laboratories, 3M Company, St. Paul, MN; Mar. 18, 2005.*
Surface Degradition and Hydrophobic Recovery of Polyolefins Treated by Air Corona and Nitrogen Atmosphere Pressure Glow Discharge; Sebastien Guimond et al; Dept of Engineering Physics, Ecole Ploytechnique, Montreal, Quebec, Feb. 6, 2004.*
Packham, D. E. (1992). Polymer Science and Technology Series: Handbook of Adhesion (pp. 94-95). England: Longman Scientific & Technical.
Carley, Ph.D., PE, J.F. (1993). Whittington's Dictionary of Plastics (3rd ed., pp. 98-99 and 156-157). Pennsylvania: Technomic.

* cited by examiner

*Primary Examiner*—Daniel Zirker
(74) *Attorney, Agent, or Firm*—Harold C. Knecht, III

(57) ABSTRACT

The present invention relates to an adhesive tape and to a method for its manufacture, the tape comprising: (A) a heat-activatable adhesive resin layer, wherein the resin is a polymer of one or more monomers selected from the group consisting of olefins, and (B) a pressure-sensitive adhesive layer, comprising an acrylic-type pressure sensitive adhesive, wherein said pressure sensitive adhesive layer is permanently and directly bonded to a first major surface of said heat-activatable adhesive layer. The present invention also relates to an intermediate article comprising the heat-activatable adhesive resin layer (A) releasably bonded to a support layer, to a composite article comprising the adhesive tape and a rubber article bonded to the second major surface of the heat-activatable layer (A), and to a vehicle comprising the composite article.

27 Claims, No Drawings

WEATHERSTRIP TAPE AND METHOD FOR PRODUCING THE SAME

FIELD OF THE INVENTION

The present invention relates to a dual-functional adhesive tape (often referred to as weatherstrip tape), more specifically to an adhesive tape comprising a layer of heat-activatable polyolefin adhesive and a layer of acrylic-type pressure-sensitive adhesive, wherein said pressure-sensitive adhesive layer is permanently and directly bonded to a first major surface of said heat-activatable adhesive layer.

BACKGROUND OF THE INVENTION

Pressure-sensitive adhesives are extremely popular for use in attachment tapes. Their use allows for fast, easy attachment of product components without the use of tools, messy liquid adhesives, or mechanical fasteners. Pressure-sensitive adhesives are available with a wide variety of properties depending on the particular application, e.g. type of substrate. Acrylic-type pressure sensitive adhesives are readily available and provide a good balance of tack, shear and peel properties on a variety of substrates and at relatively low costs.

Domestic and automotive weatherstrip seals and gaskets are commonly manufactured from materials such as ethylene-propylene-diene monomer and neoprene. These compositions are characterized as low surface energy elastomers.

For many years there has existed a desire for pressure-sensitive adhesive coated polyolefin products in which the pressure-sensitive adhesive is firmly bonded to the polyolefin and remains so at elevated temperatures. Although it is comparatively easy to bond rubber-type pressure-sensitive adhesives to polyolefin substrates, the adhesive bond tends to weaken and the product to be subject to failure at temperatures at about 65° C. or higher. Although acrylic-type pressure-sensitive adhesives have superior heat-resistance, they do not normally bond effectively to polyolefin substrates. In fact, polyolefin films are frequently used as release liners for acrylic adhesives.

Various types of treatments have been attempted, in order to increase the adhesion between a polyolefin substrate and a pressure-sensitive adhesive. However, durability of the surface treatment has oftentimes been a problem. Use of a layer or coating of material which is a good substrate for the adhesive has also been attempted. However, the weak link in this system is the interface between the polyolefin and the coating.

For example, heat-activatable polyolefin adhesives, e.g., polyethylene, polypropylene, or polyallomer (an ethylene-propylene copolymer) are well known for use on polyolefin substrates. However, such adhesives do not provide the processing and application convenience of pressure-sensitive adhesives. Furthermore, such adhesives do not yield high performance on all low-energy surfaces. In particular, heat-activatable polyolefin adhesives do not provide a sufficiently permanent bond to acrylic-type pressure sensitive adhesives.

EP-B-0 679 123 relates to a composite profile having a sealing profile and an adhesive tape, wherein the adhesive tape has a flexible supporting layer, wherein an adhesive layer covered with a removable liner is applied to a first surface of the supporting layer, wherein the supporting layer is made of foam, and wherein a second surface of the supporting layer opposite the first surface is bonded with a counter surface of the sealing profile to form a composite profile, characterized in that at least the second surface of the supporting layer is melted via the application of heat at 100° C. to 400° C. and welded with the preheated counter surface of the sealing profile.

EP-A-0 384 598 describes a dual-functional adhesive tape including a layer of a heat-activatable adhesive and a layer of pressure-sensitive adhesive which is made by adhering the pressure-sensitive adhesive to a ionizing-radiation grafted primer layer coated onto the heat-activatable adhesive.

U.S. Pat. No. 4,563,388 discloses an adhesive product comprising a polyolefin substrate and an acrylic-type pressure-sensitive adhesive which is bonded by means of a graft polymerized vinyl-coating applied on the polyolefin substrate.

Previously known dual-functional adhesive tapes incorporating heat-activatable polyolefin layer and an intermediate layer have been found to be prone to stiffness caused by the selection of the polyolefin layer. Stiffness of the polyolefin heat-activated layer can contribute to stiffness of the overall weatherstrip construction and makes it difficult for end-users to handle. Excessive stiffness also makes the tape less conformable and thus difficult to apply to irregularly curved surfaces, particularly those encountered in automotive door sealing operations.

Moreover, the application of an additional intermediate layer is very labor and cost intensive. The use of such intermediate layers also does not yield an entirely satisfactory bond over a wide variety of conditions. Fasteners of the type described in the aforementioned patents are particularly useful in the automotive industry. Automobile interiors, however, are often subject to extreme temperature and humidity conditions, for instance when a closed automobile remains in the sun for extended periods of time and/or when humidity has been allowed to enter the inside of the car.

SUMMARY OF THE INVENTION

It has now been found that the bond between the polyolefin and the pressure-sensitive adhesive is weakened in the presence of humidity even when a priming or graft intermediate layer is used, thereby causing delamination and disintegration of the tape.

There is further known a dual-functional adhesive tape having a heat-activatable resin directly bonded to an acrylic adhesive layer wherein the heat-activatable resin layer is a layer of a copolymer of ethylene and acrylic acid. A disadvantage of this type of dual-functional adhesive tape is its low heat resistance.

It is a desire of the present invention to overcome the disadvantages of the prior art and in particular to overcome the problems previously encountered when bonding heat-activatable polyolefin adhesives to pressure-sensitive adhesives. It is also desirable to provide a dual-functional tape which can withstand high humidity and/or extreme temperatures without suffering from disintegration into its components such that the dual-functional tape can be reliably used in bonding e.g. rubber gaskets in a vehicle, in particular a motor vehicle such as a car. A further desire is to provide an adhesive tape having improved processability characteristics, particularly during heating and/or bonding the HAA layer. Desirably, the invention also provides a commercially valuable, dual-functional, adhesive tape and a method for its production. Preferably, the adhesive tape is convenient to handle and easy to apply and desirable has good flexibility.

In a first aspect, the present invention provides an adhesive tape comprising: (A) a heat-activatable adhesive resin layer, wherein the resin is a polymer of one or more monomers selected from the group consisting of olefins, and (B) a pressure-sensitive adhesive layer, comprising an acrylic-type pressure-sensitive adhesive, wherein said pressure-sensitive adhesive layer is permanently and directly bonded to a first major surface of said heat-activatable adhesive resin layer.

In a second aspect, the present invention provides a composite article comprising the tape according to the first aspect of the present invention and a rubber article bonded to the second major surface of the heat-activatable adhesive resin layer (A).

In a third aspect, the present invention provides a method of making the tape in accordance with the present invention, the method comprising the steps of: (a) extruding a heat-activatable adhesive resin layer, (b) $N_2$ corona treating one major surface of said heat-activatable adhesive resin layer, (c) applying a layer of acrylic pressure-sensitive adhesive onto the $N_2$ corona treated surface of said heat-activatable adhesive resin layer. In a fourth aspect, the present invention provides an intermediate article comprising the heat-activatable adhesive resin layer (A) releasably bonded to a support layer.

The present invention also provides a vehicle comprising the composite article.

The term "permanent bond" or "permanently bonded" as used in the present invention refers to the bond between the heat-activatable adhesive layer and the pressure sensitive adhesive layer and typically means that the bond strength between the pressure-sensitive adhesive layer and the heat-activatable adhesive layer is greater than the internal strength of the pressure-sensitive adhesive layer itself. Preferably, the bond strength does not show a significant decrease over a period of time (e.g. at least a week, typically a year, preferably over several years, for example over a period of more than 10 years) and upon application of forces, such as releasing or delaminating forces.

"Significant decrease" in bond strength means a decrease in bond strength of more than 5%, particularly of more than of 2.5% of the initial value. In a preferred embodiment, the bond strength between the pressure sensitive adhesive layer and the heat-activatable adhesive layer is substantially the same after one week immersion in water at 40° C. (i.e., the difference in the bond strength is less than 7%, preferably less than 5%, even more preferably less than 1 %).

In a preferred embodiment, a permanent bond in accordance with the present invention is such as to result in cohesive failure of the pressure-sensitive adhesive layer (i.e. spitting thereof) rather than to result in adhesive failure of the bond between the heat-activatable adhesive layer and the pressure-sensitive adhesive layer when T-peel testing is carried out at 300 mm/min. In other words, the bond strength between the pressure-sensitive adhesive layer and the heat-activatable adhesive layer is greater than the internal strength of the pressure-sensitive adhesive layer itself.

The term "directly bonded" as used in the present invention means that the pressure sensitive adhesive layer is bonded to the heat-activatable adhesive resin layer without the use of any intermediate layers arranged between the heat-activatable adhesive layer and the pressure-sensitive adhesive layer, such as priming layers or intermediate layers graft-polymerized to one of the adhesive layers.

DETAILED DESCRIPTION OF THE INVENTION

Heat-Activatable Layer (HAA)

The adhesive resin used in the heat-activatable adhesive resin layer (A) (hereinafter sometimes referred to as HAA) in accordance with the present invention is a polymer of one or more olefinic monomers and is hereinafter also referred to as a heat-activatable polyolefin.

The term "heat-activatable" is conventionally used in the art of adhesive technology and means that in order to "activate" the adhesive it needs to be subjected to a heat treatment, typically between about 60° C. and about 200° C., so as to allow the heat-activatable resin layer to bond to the desired substrate. It is preferred that the surface of the HAA layer be softened applying temperature near its softening point, most preferably slightly above its melting point to achieve a good bond.

Examples of useful heat-activatable polyolefin resins are polyolefin homopolymers, such as polyethylene, polypropylene, polyolefin/polyolefin copolymers, such as ethylene/propylene copolymers (often referred to as polyallomer) and blends thereof.

Suitable blends include blends of polyethylene and polypropylene at various ratios. Suitable copolymers may be atactic, isotactic, random, block or impact copolymers.

Preferred heat-activatable polyolefin resins of the invention effectively adhere to both thermoplastic and thermoset substrates. The adhesives achieve a high degree of compatible interfacial mixing with a thermoplastic substrate while molten, which upon cooling yields a high-strength bond. With a thermoset substrate, the molten adhesives achieve a superior wetting out of the substrate surface, again yielding a high bond strength when cooled.

In one embodiment of the present invention, a propylene/ethylene copolymer having an ethylene content of up to about 10% by weight is preferred for use in the heat-activatable adhesive resin layer.

Polyolefin polymers which have been toughened and made impact resistant by means of incorporation of elastomeric segments into the polymeric chain may also be useful. Suitable impact copolymers include impact copolymer based on polypropylene or on polyethylene, for example impact polypropylene copolymer containing an ethylene-propylene elastomeric phase.

In another embodiment, the resin is a blend of polyethylene and polypropylene. Preferably, the polyethylene is used in an amount of 5 to 30% by weight, more preferably of 10 to 25% by weight, based on the total weight of the blend and the polypropylene is used in an amount of 95 to 7% by weight, more preferably in an amount of 90 to 75% by weight, based on the total weight of the blend.

The heat-activatable adhesive resin in accordance with the present invention preferably exhibits one of the features selected from a melting point of about 120 to about 170° C. (preferably of about 130 to about 165° C.), a melt flow index of about 2 to 18 g/10 min (preferably of about 5 to 9 g/10 min), a tensile strength at break of about 25 to about 45 $N/cm^2$ (preferably of about 30 to 40 $N/cm^2$), an e-modulus at 100% elongation of about 10 to about 20 $N/cm^2$ (preferably of about 12 to about 16 N/cm), and an elongation at break of about 200 to about 450% (preferably of about 230 to about 400%). More preferably, the heat-activatable adhesive resin exhibits at least two, more preferably at least three, and even more preferably all of the aforementioned features.

Suitable commercially available heat-activatable polyolefins include poylpropylene copolymers of the trade name FINAPRO™, such as those of the designation FINAPRO™ 5660, FINAPRO™ 8780, FINAPRO™ 5642, and FINAPRO™ 5712 (available from ATOFINA Petrochemicals), ethylene/propylene copolymers of the trade name ELTEX™ P, such as KS 414, KS 409, or KL 467 (available from Solvay Polymers), or those of the trade designation NOVOLEN™, such as MC 3200 (available from Targor GmbH, Ludwigshafen, Germany).

The thickness of the HAA layer is determined by the end-use of the adhesive tape typical thicknesses being in the range of about 30 to 300 µm.

If desired, the heat-activatable adhesive resin layer may also contain non-resinous ingredients, such as conventional additives. Such additives may include fillers, pigments, dyes, crosslinking agents, viscosity adjusting agents, dispersants, extrusion aids and mixtures thereof.

Pressure-Sensitive Adhesive Layer (B)

The pressure-sensitive adhesive layer (B) in accordance with the present invention comprises an acrylic-type pressure-sensitive adhesive. Preferably, the pressure-sensitive adhesive layer essentially consists of an acrylic-type pressure-sensitive adhesive.

Useful acrylic type pressure-sensitive adhesives include those known to the person skilled in the art. Particularly useful pressure-sensitive adhesives include ultraviolet-radiation polymerized acrylic pressure-sensitive adhesives. Preferably, these pressure-sensitive adhesives are prepared from a composition comprising at least one alkyl acrylate monomer, preferably a monofunctional unsaturated acrylate ester of a non-tertiary alcohol, the molecules of which preferably have from about 4 to about 14 carbon atoms. Such monomers include, e.g., isooctyl acrylate, 2-ethyl hexyl acrylate, isononyl acrylate, decyl acrylate, dodecyl acrylate, butyl acrylate, and hexyl acrylate. The alkyl acrylate monomers can be used to form homopolymers or they can be copolymerized with polar copolymerizable monomers. When copolymerized with strongly polar copolymerizable monomers, the alkyl acrylate monomer generally comprises at least about 75% of the photopolymerizable polymers. When copolymerized with moderately polar copolymerizable monomers, the alkyl acrylate monomer generally comprises at least about 60% of the photopolymerizable polymer.

The polar copolymerizable monomers can be selected from strongly polar copolymerizable monomers such as acrylic acid, itaconic acid, hydroxyalkyl acrylates, cyanoalkyl acrylates, acrylamides or substituted acrylamides, or from moderately polar copolymerizable monomers, such as N-vinyl pyrrolidone, acrylonitrile, vinyl chloride, or diallyl phthalate. When strongly polar monomers are used, they preferably comprise from about 1 to about 25 parts, preferably from about 4 to about 20 parts of the acrylic copolymer. When moderately polar monomers are used, they preferably comprise from about 20 to about 40 parts of the acrylic copolymer.

The composition comprising the polymerizable monomers may also contain a photoinitiator in order to induce polymerization of the monomers. Useful photoinitiators include benzoin ethers, such as benzoin methyl ether or benzoin isopropyl ether, substituted benzoin ethers, such as anisole methyl ether, substituted acetophenone derivatives, such as 2,2-diethoxyacetophenone and 2,2-dimethoxy-2-phenylacetophenone, substituted alpha-ketols, such as 2-methyl-2-hydroxypropiophenone, aromatic sulfonyl chlorides, such as 2-naphthalene sulfonyl chloride, and photoactive oximes, such as 1-phenyl-1,1-propanedione-2-(o-ethoxycarbonyl)-oxime. Preferably, the photoinitiator is present in an amount of about 0.01 to about 1 part per hundred parts (pph) of the acrylic monomers of the pressure sensitive adhesive compositions.

The photopolymerizable composition may also contain a crosslinking agent to enhance heat-resistance. Preferred crosslinking agents for acrylic pressure-sensitive adhesives are multifunctional acrylates such as 1,6-hexanediol diacrylates as well as those disclosed in U.S. Pat. No. 4,379,201, such as trimethylolpropane triacrylate, pentaerythritol tetraacrylate, 1,2-ethylene glycol diacrylate, and 1,2-dodecanediol diacrylate. Other useful crosslinking agents include substituted triazines, such as those disclosed in U.S. Pat. Nos. 4,329,384, 4,391,687, 4,330,590, e.g., 2,4-bis(trichloromethyl)-6-(3,4-dimethoxyphenyl)-s-triazine and other chromophore halogen-s-triazines. When used, the crosslinking agent is present in an amount of from about 0.01 to about 1 pph, wherein pph means (additional) parts per hundred parts of the total composition.

In one preferred embodiment, the pressure sensitive adhesive layer comprises an acrylic cellular pressure-sensitive adhesive membrane as described in U.S. Pat. No. 4,415,615. A cellular pressure-sensitive adhesive membrane is made by the steps of
(a) frothing a composition which is polymerizable to a pressure-sensitive adhesive state,
(b) coating the froth onto a backing, and
(c) polymerizing the coated froth in situ to a pressure-sensitive adhesive state to provide a pressure-sensitive adhesive membrane having a cellular structure.

Frothing can be conveniently accomplished by whipping a gas into the polymerizable composition. After coating the frothed composition onto a backing, the polymerization may be initiated by ultraviolet radiation as taught in U.S. Pat. No. 4,181,752. Where such photopolymerization is desired, an inert frothing gas is preferably used as air tends to quench photopolymerization. Carbon dioxide and nitrogen are preferred frothing gases.

In another preferred embodiment, the pressure sensitive adhesive layer may be a foam-like layer. Such foam-like adhesive layers may be prepared from a monomer composition comprising microspheres. Suitable microspheres include glass or polymeric microspheres. The microspheres should have an average diameter of 10 to 200 micrometers, and comprise from about 5 to about 65 volume percent of the core layer. The thickness of foam-like layers in preferred tapes of the present invention ranges from 0.3 mm to about 4.0 mm in thickness.

Preferred glass microspheres have average diameters of about 50 µm. When glass microspheres are used, the pressure sensitive adhesive layer should be at least 3 times as thick as their diameter, preferably at least 7 times. The thickness of layers containing such glass microspheres should be at least six times, preferably at least twenty times that of each microsphere-free layer.

Polymeric microspheres are also useful for some compositions such as those described in U.S. Pat. Nos. 3,615,972, 4,075,238, 4,287,308, and 4,855,170. Such microspheres are available from Kema Nord Plastics under the trade name "EXPANCEL" and from Matsumoto Yushi Seiyaku under the trade name "MICROPEARL". In expanded form, the microspheres have a specific density of approximately 0.02–0.036 g/cc. It is possible to include the unexpanded microspheres in the core layer and subsequently heat them to cause expansion, but it is generally preferred to mix in the expanded microspheres. This process ensures that the hollow microspheres in the final core layer are substantially surrounded by at least a thin layer of adhesive.

In a highly preferred embodiment, the adhesive tape of the present invention may comprise a second pressure-sensitive adhesive layer. Such second layer consists of a polymerized acrylic copolymer which may incorporate similar or dissimilar acrylic monomers in like or unlike thicknesses, having similar or different additives from those acrylic copolymers contained in the first pressure-sensitive adhesive layer. In such an embodiment, one layer is preferably a foam-like pressure-sensitive acrylic adhesive and the second layer is a non-foam-like pressure-sensitive acrylic adhesive.

Other useful materials which may be blended into the first and/or second pressure-sensitive adhesive layer include fillers, pigments, fibrous reinforcing agents, woven and non-woven fabrics, foaming agents, antioxidants, stabilizers, fire retardants, and viscosity adjusting agents.

An especially useful filler material is hydrophobic silica as disclosed in U.S. Pat. Nos. 4,710,536 and 4,749,590. In one preferred embodiment of the present invention, the pressure-sensitive adhesive layer further comprises from about 2 to about 15 pph of a hydrophobic silica having a surface area of at least 10 $m^2/g$.

The pressure-sensitive adhesive compositions are preferably prepared by premixing together the photopolymerizable monomers and the photoinitiator. This premix is partially polymerized to a viscosity range of from about 500 cps to about 5,000 cps, as measured according to ASTM 4016/93, to achieve a coatable syrup. Alternatively, the monomers may be mixed with a thixotropic agent such as fumed hydrophilic silica to achieve a coatable thickness. The crosslinking agent(s) and any other optional ingredients are added to the syrup prior to in situ crosslinking and polymerization.

Construction

In the adhesive tape according to the present invention the pressure sensitive adhesive layer is permanently and directly bonded to a first major surface of said heat activatable adhesive resin layer. In particular, the adhesive tape of the present invention does not include an intermediate layer between the heat-activatable adhesive resin layer and the pressure-sensitive adhesive layer, such as layers of the type previously used in order to bond the pressure-sensitive adhesive to the HAA like priming layers or layers of acrylic type polymer grafted onto the HAA.

The bond strength between the pressure-sensitive adhesive and the HAA is such as to result in cohesive failure of the pressure-sensitive adhesive layer rather than to result in adhesive failure of the pressure-sensitive adhesive/HAA bond in case of T-peel testing at a rate of 300 mm/min, indicating that the pressure-sensitive adhesive/HAA bond strength is greater than the internal strength of pressure-sensitive adhesive layer itself, even though no intermediate layer is used. The adhesive tape of the present invention can withstand extreme environmental conditions such as high temperatures and/or high humidity over a long period of time.

Since no intermediate layer is needed, the tape of the present invention is economically more valuable as compared to conventional tapes and can be produced at reasonable costs.

The first major surface of the HAA layer may be $N_2$ corona treated as described with respect to the method according to the present invention. In a preferred embodiment, the $N_2$ corona treatment is such as to result in a surface energy as measured according to DIN 53364 of at least about 40 dyne/cm, preferably at least about 45, most preferably at least about 50 dyne/cm.

The adhesive tape may further include a support layer bonded to the outermost surface, i.e. to the second major surface of the heat-activatable adhesive resin layer (A). The support layer is not particularly restricted and a variety of materials may be employed for the support layer. The material for the support layer is preferably selected based on the properties of the specific HAA resin employed, and the desired stability and handleability of the final or intermediate article. For example, the support layer may be comprised of polyester polymers, such as polyethylene terephthalate. The material of the support layer should be selected such that the second major surface of the HAA layer may be releasably bonded to the support layer. Preferably, the release force between the HAA layer and the support layer ranges from about 20 cN/2.54 cm to about 120 cN/2.54 cm. The support layer may be treated in a number of known ways, in order to provide for the desired release force value. Suitable treatments include chemical priming, corona treatment, or use of a tie-layer.

Preferably, a suitable support layer exhibits a thickness of about 50 to about 100 µm, more preferably of about 60 to about 80 µm.

The present invention also relates to an intermediate article comprising the heat-activatable adhesive resin layer (A) according to the present invention releasably bonded on one major surface (the second major surface, i.e. that surface which will not be bonded to the acrylic type pressure-sensitive adhesive layer) to the aforementioned support layer.

Method of Manufacture

The tape of the present invention can be produced by a method comprising the steps of: (a) extruding a heat-activatable adhesive resin layer, (b) $N_2$ corona treating one major surface of said heat-activatable adhesive resin layer, (c) applying a layer of acrylic pressure-sensitive adhesive onto the $N_2$ corona treated surface of said heat-activatable adhesive resin layer.

Extruding the heat-activatable polyolefin layer may be accomplished according to methods known in the art, for example by means of conventional extrusion equipment.

Step (a) may also include extruding the HAA onto a suitable support layer, thereby providing the intermediate article according to the present invention. If a support layer is present, the HAA will be bonded thereto by its second major surface.

The corona treatment is carried out by exposing at least the first major surface of heat-activatable adhesive resin layer to an electrical discharge. The treatment can be carried out on any commercial corona treatment equipment as will be known to those skilled in the art, for example as described in U.S. Pat. Nos. 3,639,134, 5,639,546 or 5,905,099. In accordance with the present invention, the corona treatment is carried out in a nitrogen gas atmosphere.

The amount of energy applied can be varied dependent on net power, electrode width, speed and other parameters as will be known to the person skilled in the art. The discharge energy density suitably ranges from about 15 to about 500 watts/$m^2$/minute, preferably from about 80 to about 250 watts/$m^2$/minute. The energy density can be calculated from the equation:

Energy Density [watts/$m^2$/minute]=Net Power [W]/
(Electrode Width [m]×Line speed (cm/mm)).

In a preferred embodiment, the $N_2$ corona treatment is such as to result in a surface energy as measured according to DIN 53364 of at least about 40 dyne/cm, preferably at least about 45, most preferably at least about 50 dyne/cm.

After having corona treated one major surface of the heat-activatable adhesive resin layer, a layer of acrylic pressure-sensitive adhesive is applied onto the corona treated surface.

The time gap between the corona treatment and the application of the acrylic pressure sensitive adhesive should not be too long. The acrylic pressure-sensitive adhesive is typically applied within a period of not more than 6 months, preferably not more than 3 months, and more preferably within 1 month. Most preferably, the acrylic type pressure sensitive-adhesive is applied subsequently after having $N_2$ corona treated the HAA layer.

In one preferred embodiment step (c) comprises laminating a preformed layer of acrylic pressure-sensitive adhesive onto the $N_2$ corona treated surface of said heat-activatable adhesive resin layer. In this embodiment, the HAA layer may be transparent or non-transparent, and may include pigments or dyes capable of absorbing a substantial amount of radiation.

In a particularly preferred embodiment step (c) comprises applying a layer of a radiation-curable acrylic composition onto said $N_2$ corona treated surface and radiation-curing the composition in situ. In this embodiment, the HAA layer is preferably transparent and does not absorb a substantial amount of radiation during radiation-curing of the pressure-sensitive adhesive. Preferably, the HAA in this embodiment does not include dyes and pigments capable of absorbing a substantial amount of the radiation used for in situ curing of the adhesive composition.

A particular advantage of this preferred embodiment is that the HAA layer may function as an in-process bottom liner, i.e. the acrylic syrup may be directly coated onto the HAA layer without the need for an additional transfer and laminating step of a preformed layer of pressure-sensitive adhesive.

The acrylic-pressure-sensitive adhesive layer may finally be covered by a conventional release liner via its outermost surface.

Use

The adhesive tape of the present invention may be adhered to a wide variety of substrates by means of both, the heat-activatable adhesive resin layer (after removal of the optional support layer, if present) and the pressure-sensitive adhesive layer (after removal of the optional release liner, if present).

The adhesive tape of the present invention is particularly useful for attaching rubber articles (by means of the HAA layer) to a variety of surfaces (by means of the pressure-sensitive adhesive layer), as is desired in the automotive industry. The HAA layer of the adhesive tape in accordance with the present invention provides excellent adhesion to a wide variety of rubbers and low surface energy elastomers, such as rubbers based on ethylene-propylene-diene monomer (EPDM) and/or neoprene. Specific examples include rubber brands of SANTOPRENE™ (available from Monsanto Chemical Company) or rubber brands of EPDM mixed into polypropylene.

In order to bond the rubber article to the HAA layer, the optional support layer on the second major surface of the HAA layer is removed. Lamination may be performed according to methods known in the art using conventional heat-bond laminating equipment, such as a Heat-Bond-Laminator Model TE 2417 available from EHVO GmbH, Germany. Typically, a sufficient amount of heat is first applied in order to activate the HAA layer. For instance, the HAA layer may be preheated using an atmosphere of air having a temperature of up to about 650° C. The preactivated tape is laminated to the desired rubber article using an appropriate amount of pressure. The pressure-sensitive adhesive layer may serve to finally attach the resulting composite article to a variety of surfaces, for instance to a metal surface of a car.

The present invention also relates to a vehicle comprising the composite article in accordance with the present invention. In a preferred embodiment, the vehicle is selected from motor vehicles, such as cars.

The present invention is illustrated by the following non-limiting examples.

EXAMPLES

1. Test Methods

A. Characterization of Heat-activated Adhesive Resin Layer

1. Tensile Strength and Elongation at Break

Tensile strength at break (N/mm$^2$) and elongation at break (%) of the heat-activated adhesive layer were measured according to DIN (Deutsche Industrie Norm) Method 53455. Three dog bone-shaped samples having a width of 6 mm and a length of 80 mm were evaluated and the results averaged. The jaws of the tensile tester were separated at a rate of 508 mm/min.

2. E-Modulus at 100% Elongation (N/MM$^2$)

E-modulus of the heat-activated adhesive resin layer, measured at 100% elongation, was determined according to DIN (Deutsche Industrie Norm) Method 53455. Three dog bone-shaped samples having a width of 6 mm and a length of 80 mm were measured and the results averaged. The jaws of the tensile tester were separated at a rate of 508 mm/min.

3. Release Force Between Heat-Activated Adhesive Resin Layer and Support Layer

The release force between the heat-activated adhesive resin layer and the support layer was measured using a 180° Peel Adhesion Test (N/cm) according to Method PSTC4 (Pressure-Sensitive Tape Council, Chicago, Ill./USA). The peel speed of the heat-activated adhesive layer from the support layer was 300 mm/min.

4. Surface Energy of Heat-activated Adhesive Resin Layer After $N_2$-corona Treatment A calibrated set of commercially available felt-tip pens especially designed to estimate surface energy of polyolefin films was employed to measure the surface tension of the heat-activated adhesive resin layer after is had been corona treated in an atmosphere of nitrogen. The pen set is available as QUICKTEST from Arcotec GmbH, Moensheim, Germany. The surface energy can be determined using the pen set according to DIN (Deutsche Industrie Norm) Method 53 364. The treated surface is marked with pens containing ink having increasing surface tensions in increments of about 2 mN/m (same numerical value as the older dyne/cm unit). In particular, a single pen QUICKTEST 38 can be used to determine whether the surface energy of a film is above or below 38 mN/m. The bond strength between heat-activated adhesive resin layer and pressure-sensitive adhesive layer is determined by the T-peel test described below.

5. Melt Flow Index

The melt flow index can be determined according to ASTM D-1 238.

II. Sample Preparation

Samples of weatherstrip tape, about 10 mm in width and about 150 mm long, were prepared by the procedure described in the examples.

The heat-activated adhesive side of the weatherstrip tape was then heat-laminated to an ethylene-propylene-diene-monomer (EPDM) rubber door seal having a Shore A hardness of 90 (obtained as EPDM Flachprofil 90SHA, 3×30 mm, FP96 from Saar Gummiwerk GmbH, Wadern, Germany). The heat lamination was performed using a commercially available equipment obtainable as Heat-Bond Laminator MODEL TE 2417 from EHVO GmbH, Kuehnheide, Germany. This equipment preheats the EPDM rubber profile directly before the heat-activated adhesive surface of the weatherstrip tape is pressed onto it. The temperature of the air stream used to pre-heat the rubber was about 65° C. at a flow rate of 90 liters/min. The tape application speed was about 12 m/mm and the infrared radiation setting was at 55%.

The protective liner was then removed from the pressure-sensitive adhesive layer and replaced by an anodized aluminum strip having a width of about 16 mm (wider than the sample) thickness of 136 μm. The aluminum strip was pressed onto the pressure-sensitive adhesive layer by rubber-coated roller.

Bond Aging

The weatherstrip tape, heat-bonded on one side to the EPDM rubber profile and pressure-sensitive adhesively bonded on the other side to an aluminum strip, was then subjected to both of the following conditions, respectively:
1. Hot water immersion for 1 wk at 40° C.
2. Temperature cycling consisting of ten (10) temperature cycles where each cycle consisted of 16 hrs at 38° C. and 98% relative humidity, 4 hrs at minus 40° C. and 4 hrs at 900° C.

T-Peel Test Procedure

After either one of the aging procedures above was performed, the bonded weatherstrip construction was subjected to a T-peel test. The bond line between the pressure-sensitive adhesive layer and heat-activated adhesive resin layer was opened slightly by hand so that the test measured the strength of the bond between the heat-activated adhesive layer and the pressure-sensitive adhesive layer. The jaws of the tensile tester grasped the end of the aluminum strip on one side and the rubber profile on the other and pulled them apart in a T-peel mode at a rate of 300 mm/min according to ASTM D-1 876-95. The data was recorded in units of N/6 mm of tape width and then extrapolated to give reported results in N/cm.

B. Release Force of the Heat-Activated Adhesive Resin Layer from the Support Layer A 180° Peel Adhesion test was performed at a peel speed of 300 mm/min according to the test method PSTC-1 (Pressure-Sensitive Tape Council, Chicago, Ill./USA). Tests were made on strip having a width of 2.54 cm. Results were reported in cN/2.54 cm.

III. Materials Employed in the Examples

FINAPRO™ PPC 5660—polypropylene impact copolymer. Melt flow index 230° C./2.16 k according to ASTM D 1238=7. Melting range 160–165° C. Vicat softening point (10N—50° C. per hours) according to ASTM D 1525=150° C. Available from Fina Chemicals, Seneffe, Belgium.

FINAPRO™ PPC 8780—a controlled-rheology heterophasic polypropylene copolymer with a melt flow index according to ISO 1133 of 18 g/10 min. Melting point according to ISO 3146 of 165° C. Vicat softening point (50N—50° C. per hour) according to ISO 306 of 65° C. Vicat softening point (10N—50° C. per hour) according to ISO 306 of 135° C. Available from Fina Chemicals, Seneffe, Belgium.

FINAPRO™ PPC 5642—a nucleated impact copolymer of polypropylene. Melt flow index 230° C./2.16 kg according to ASTM D 1238=7. Melting range 160–165° C. Vicat softening point (10N—50° C. per hour) according to ASTM D 1525=152° C. Available from Fina Chemicals, Seneffe, Belgium.

FINAPRO™ PPC 5712—a polypropylene impact copolymer formulated with an antistatic additive package. Melt flow index 230° C./2.16 kg according to ASTM D 1238=7. Melting range 160–165° C. Available from Fina Chemicals, Seneffe, Belgium.

ELTEX™ P KS 414—a polypropylene manufactured with SOLVAY's superactive catalyst and continuous process. A random copolymer with a high ethylene content, containing slip and anti-blocking agents. Melt flow index at 230° C., under 2.16 kg, according to ASTM D 1238 or ISO 1133 or DIN 53735, in units of g/10 min using pellets=7.3. Melting point according to ASTM D 3418=134° C. Vicat Softening temperature (1 kg) according to ASTM D 1525, ISO 306 or DIN 53460=120° C. Shore D hardness at 23° C.=62. Available from SOLVAY Polyolefins Europe GmbH, Brussels, Belgium.

ELTEX™ P KS 409—a polypropylene manufactured with SOLVAY's superactive catalyst and continuous process. A random copolymer with a high ethylene content and no additives. Melt flow index at 230° C., under 2.16 kg, according to ASTM D 1238 or ISO 1133 or DIN 53735, in units of g/10 min using pellets=5. Melting point according to ASTM D 3418=134° C. Vicat Softening temperature (1 kg) according to ASTM D 1525, ISO 306 or DIN 53460=120° C.

Shore D hardness at 23° C.=62. Available from SOLVAY Polyolefins Europe GmbH, Brussels, Belgium.

ELTEX™ P KL 467—polypropylene random copolymer containing slip agents. Melting point according to ISO 3146=143° C. Melt flow index (230° C./2.16 kg) in g/10 min according to ISO 1133=2.0. Available from SOLVAY Polyolefins Europe GmbH, Brussels, Belgium.

NOVOLEN™ 3200 MC—a controlled-rheology modified propylene random copolymer, contains no slip or anti-blocking agents. Melt flow index (230° C./2.16 kg) according to ISO 1133=8. Melting temperature by differential scanning calorimetry (DSC) according to ISO 3146=145° C. Available from Targor GmbH, Ludwigshafen, Germany.

Example 1

Preparation of the Intermediate Article (Heat-Activated Adhesive Resin Layer on a Support Layer)

A support layer comprising a 70 μm thick polyester (polyethylene terephthalate) film having a 18 μm thick tie-layer extruded onto one surface was obtained from Frantschach/AssiDomaen (Belgium).

A heat-activated adhesive resin layer of a 60 μm thick layer of polypropylene-ethylene random copolymer (available as FINAPRO 5660 from Fina Chemical Company) was extruded directly onto the tie-layer surface of the support layer using conventional extrusion equipment comprising a single-screw extruder and a slot die.

The release force of the support layer from the heat-activatable adhesive resin layer was measured to be 20 cN/2.54 cm. This is an intermediate value which provides sufficient adhesion between the layers to permit handling of the thin heat-activated adhesive layer on the support without involuntary separation of the layers, but which simultaneously provides a low enough release force so that the support can be separated easily from the weatherstrip tape directly before it is heat-bonded to a rubber profile. The heat-activated adhesive layer and the support layer were both largely transparent to UV light.

$N_2$-Corona Treatment of the Heat-Activated Adhesive Resin Layer

The surface of the heat-activated layer was then subjected to corona treatment in a nitrogen atmosphere comprising only about 10–30 ppm oxygen. A discharge energy of 5 kW was employed at a film line speed of 20 m/min. The surface energy was estimated to be about 50 dyne/cm using the calibrated pen test method described above under TEST METHODS.

Preparation of the Syrup Precursor to the First Pressure-Sensitive Adhesive Layer A syrup having a viscosity of about 2000 cps (Mpa.s) was prepared by subjecting a mixture of 92.5 parts by weight isooctyl acrylate (IOA), 7.5 parts by weight acrylic acid (AA) and 0.04 pph IRGACURE 651 photoinitiator (available from Ciba-Geigy, Basel, Switzerland) to a UV light source to reach a monomer conversion of about 4. The photopolymerization was stopped by removal of the UV light source.

All additives to the monomers were calculated in parts per hundred (pph) based on 100 parts monomer. An additional portion of 0.36 pph photoinitiator was then added to the syrup. A crosslinker was added (hexanediol diacrylate or HDDA) in the amount of 0.12 pph based on total monomer. Hydrophobic fumed silica (AEROSIL 972 from Degussa) was added to the syrup in the amount of 6 pph and mixed well. Hollow glass microspheres (3M SCOTCHLITE™ K 15 Glass Bubbles available from 3M Company, St. Paul, Minn./USA) were added in the amount of 4 pph. A black pigment, available as Pennco 9B117 UV/EB Color from PennColor Inc., Doylestown/USA, was added at 0.35%. The resulting syrup was light gray.

Coating and Curing of the Syrup to Form a First Pressure-Sensitive Adhesive Layer A layer of about 800 μm (0.8 mm) of the partially-polymerized acrylic syrup described above was coated onto the $N_2$-corona-treated surface of the heat-activated adhesive resin layer using a knife-coater. The top surface of the acrylic syrup coating was then covered with a transparent siliconized polyester release liner.

The laminate thus prepared was exposed to UV radiation from both below the web (through the transparent support layer and the heat-activated adhesive resin layer) and above the web (through the transparent liner) to effect essentially complete polymerization of the acrylic syrup. The total radiation intensity was about 4.0 mW/cm$^2$ supplied from medium pressure mercury lamps having 90% of their emission between the wavelengths of 300 nm and 400 nm with a maximum output at about 350 nm.

Preparation of a Second Layer of Acrylic Pressure-Sensitive Adhesive

A primer layer comprising a polyamide (available as MACROMELT™ 6240 from Henkel GmbH, Duesseldorf, Germany) was then prepared by coating a solution of 10 parts by weight polyamide, 50 parts by weight isopropanol and 50 parts by weight n-propanol onto a release liner and drying in a forced air oven.

An acrylic pressure-sensitive adhesive (PSA) comprising 65 parts isooctyl acrylate (IOA), 5 parts acrylic acid (AA) and 30 parts methyl acrylate (MA) was prepared by solution polymerization according to the method described in U.S. Patent Reissue 24,906 (Ulrich). A 50 μm thick layer of the acrylic adhesive was then placed on top of the polyamide primer layer by coating the solution polymer onto the polyamide layer and drying.

Lamination of Second Pressure-Sensitive Adhesive Layer to the First Pressure-Sensitive Adhesive Layer The top temporary polyester liner present during the radiation polymerization was then removed from the first layer of acrylic pressure-sensitive adhesive.

The second thinner acrylic adhesive layer bearing the polyamide primer was laminated on top of the first thicker acrylic adhesive layer in a fashion so that the primer layer was located between the two layers of acrylic pressure-sensitive adhesive.

The paper liner covering the second layer of acrylic adhesive was then removed, and a more heat-resistant polymeric film-based release liner was put in its place.

The bottom support layer adjacent to the heat-activated adhesive layer was then stripped away leaving the heat-activatable adhesive layer exposed and ready for bonding to a flexible rubber profile designed to seal vehicle doors.

Testing

The laminate thus prepared was tested according to the method given above under TEST METHODS.

Test results of the T-peel measurements after 24 hours at 23° C. showed that the bond strength between the acrylic foam and the heat-activated film was go great that the foam itself split cohesively during the T-peel test. No separation of the bond between the heat-activated film and the acrylic foam could be observed.

Additional test results are summarized in Table 2.

Examples 2–10

Example 1 was repeated with the sole exception that each of the polyolefin layers given were employed in place of FINAPRO 5660. Each polymer indicated was, in turn, extruded onto the polyester support layer as described in Example 1 and employed as the heat-activatable film layer in the weatherstrip construction.

Chemical composition and properties of the polyolefin polymers employed are summarized in Table 1.

The test results on the completed weatherstrip constructions are given in Table 2.

TABLE 1

Physical properties of heat-activated adhesive films

| Ex. | Tradename | M. P. (1) ° C. | Melt flow index (2) g/10 min | e-mod at 100% elong. (3) N/cm$^2$ | Tens. at break (4) N/cm$^2$ | Elong. at break (4) % |
|---|---|---|---|---|---|---|
| 1 | FINAPRO ™ 5660 | 160 | 7 | 15 | 35 | 379 |
| 2 | FINAPRO ™ 8780 | 160 | 18 | 13 | 27 | 232 |
| 3 | FINAPRO ™ 5642 | 160 | 7 | 1.5 | 34 | 380 |
| 4 | FINAPRO ™ 5712 | 160 | 7 | 14 | 32 | 390 |
| 5 | ELTEX ™ P KS 414 | 134 | 7.3 | 12 | 34 | 394 |
| 6 | ELTEX ™ P KS 409 | 134 | 5 | 1.1 | 30 | 396 |
| 7 | ELTEX ™ KL 467 | 143 | 2 | 13 | 41 | 400 |
| 8 | Novolen ™ MC 3200 | 145 | 11 | 14 | 39 | 402 |
| 9 | Blend PP/PE 90/10 | — | — | 11.53 | 26.3 | 357 |
| 10 | Blend PP/PE 75/25 | — | — | 11.46 | 28.0 | 381 |

(1) ASTM D-3418, values taken from manufacture's literature
(2) ASTM D-1238, values taken from manufacture's literature
(3) DIN 53457, measured independently
(4) DIN 53 455, measured independently

Example 11

Example 1 was repeated with the exception that both the thicker acrylic foam pressure-sensitive adhesive layer and the thinner acrylic pressure-sensitive adhesive transfer tape were prepared separately and then transferred onto the nitrogen corona-treated, heat-activated adhesive layer.

T-peel measurements after hot water aging and temperature cycling are shown in Table 2 and demonstrate that the adhesive bond as formed by transferring a preformed pressure-sensitive adhesive tape as if polymerizing the acrylic type adhesive in situ.

Comparative Example 1

Example 1 was repeated with the exception that the surface of the heat-activated film was prepared for bonding by coating it with a thin film of acrylic monomers and then radiation grafting them onto the surface as described in EP-A-0 384 598 (3M). The acrylic pressure-sensitive adhesive layer was then transferred onto the chemically grafted surface of the heat-activated adhesive layer.

T-peel measurements after aging of laminates in hot water and after temperature cycling are summarized in Table 2 and show adhesive failure between the heat-activated adhesive layer and the pressure-sensitive adhesive layer.

TABLE 2

Test results

| Ex. | Treatment for heat-activated adhesive layer | Method of application of pressure-sensitive adhesive layer to heat-activated adhesive layer | T-peel after water imm. 1 wk 40° C., N/cm | T-peel after 10 temp. Cycles, N/cm |
|---|---|---|---|---|
| 1 | N$_2$ corona treatment | On-web polym. | 30 coh** | Failure in the EPDM rubber |
| 2 | N$_2$ corona treatment | Polym. Of PSA directly on heat-activated adhesive | 32 coh** | Failure in the EPDM rubber |
| 3 | N$_2$ corona treatment | Polym. Of PSA directly on heat-activated adhesive | | |
| 4 | N$_2$ corona treatment | Polym. Of PSA directly on heat-activated adhesive | | |
| 5 | N$_2$ corona treatment | Polym. Of PSA directly on heat-activated adhesive | | |
| 6 | N$_2$ corona treatment | Polym. Of PSA directly on heat-activated adhesive | | |
| 7 | N$_2$ corona treatment | Polym. Of PSA directly on heat-activated adhesive | | |
| 8 | N$_2$ corona treatment | Polym. Of PSA directly on heat-activated adhesive | 25 coh** | 25* |
| 9 | N$_2$ corona treatment | Polym. Of PSA directly on heat-activated adhesive | | |
| 10 | N$_2$ corona treatment | Polym. Of PSA directly on heat-activated adhesive | | |
| 11 | N$_2$ Corona treatment | Transfer of finished pressure-sensitive adhesive layer | 28 coh** | 28** |

TABLE 2-continued

| Ex. | Treatment for heat-activated adhesive layer | Method of application of pressure-sensitive adhesive layer to heat-activated adhesive layer | T-peel after water imm. 1 wk 40° C., N/cm | T-peel after 10 temp. Cycles, N/cm |
|---|---|---|---|---|
| | | Test results | | |
| C1 | In-situ graft polymerization of a primer layer. | Transfer of finished pressure-sensitive adhesive layer | 8 adh* | 30* |

Adh* = adhesive failure between pressure-sensitive adhesive layer and heat-activated adhesive layer
Coh** = cohesive (internal) failure of the pressure-sensitive adhesive layer, indicating the strength of the bond between the pressure-sensitive adhesive layer and the heat-activated adhesive resin layer is higher than the internal strength of the pressure-sensitive adhesive layer itself.

The invention claimed is:

1. An adhesive tape comprising:
   (A) a heat-activatable adhesive resin layer, wherein the resin is a polymer of one or more olefinic monomers, and
   (B) a pressure-sensitive adhesive layer, comprising an acrylic-type pressure sensitive adhesive,
   wherein said pressure sensitive adhesive layer is permanently and directly bonded to a first major surface of said heat-activatable adhesive layer and said first major surface has been $N_2$ corona treated.

2. The tape of claim 1, wherein said permanent bond between said pressure-sensitive adhesive layer and said heat-activatable layer is such as to result in cohesive failure of the pressure sensitive adhesive layer in case of T-peel testing at a rate of 300 mm/mm.

3. The tape of claim 1, wherein said heat-activatable adhesive resin exhibits at least one of the features selected from a melting point of about 120 to about 170° C., a melt flow index of about 2 to 18 g/10 mm, a tensile strength at break of about 25 to 45 N/cm, an e-modulus at 100% elongation of about 10 to about 20 N/cm$^2$, and an elongation at break of about 200 to 450%.

4. The tape of claim 1, wherein said heat-activatable adhesive resin is selected from polypropylene, polyethylene, ethylene/propylene copolymers, and mixtures thereof.

5. The tape of claim 1, wherein said heat-activatable adhesive resin is an impact polypropylene copolymer containing an ethylene-propylene elastomeric phase.

6. The tape of claim 1, wherein said layer (A) has a thickness of 30 to 300 μm.

7. The tape of claim 1, wherein said acrylic-type pressure-sensitive adhesive is a homopolymer or copolymer derived from a radiation curable acrylic composition comprising at least one $C_4$–$C_{14}$ alkyl acrylate monomer.

8. The tape of claim 7, wherein said acrylic-type pressure-sensitive adhesive further comprises microspheres selected from glass microspheres and polymeric microspheres and mixtures thereof.

9. The tape of claim 1, wherein said acrylic-type pressure-sensitive adhesive comprises
   (a) at least about 60 parts of an alkyl acrylate monomer, the alkyl groups of which have an average of 4 to 12 carbon atoms, and
   (b) correspondingly, up to about 40 parts of a monoethylenically unsaturated polar copolymerizable monomer, and
   (c) from about 0.01 part to about 10 parts of a photoinitiator per 100 parts of monomer.

10. The tape of claim 9, wherein said acrylic-type pressure-sensitive adhesive comprises from about 60 to about 99 parts of an alkyl acrylate monomer selected from isooctyl acrylate, butyl acrylate, isononyl acrylate, 2-ethyl-hexyl acrylate, and isodecyl acrylate, and correspondingly, from about 1 part to about 40 parts of a polar copolymerizable monomer, said polar copolymerizable monomer being selected from acrylic acid, itaconic acid, n-vinyl pyrrolidone, N-vinyl caprolactam, acrylamide, substituted acrylamide, and methacrylic acid.

11. The tape of claim 1, wherein said acrylic-type pressure-sensitive adhesive is a cellular pressure-sensitive adhesive.

12. The tape of claim 1, further comprising a second layer of acrylic-type pressure sensitive adhesive.

13. The tape of claim 1, further comprising a support layer releasably bonded to a second major surface of said heat-activatable adhesive layer (A).

14. A composite article comprising the tape of claim 1 and a rubber article bonded to a second major surface of the heat-activatable layer (A).

15. A method of making an adhesive tape, comprising the steps of:
   (a) extruding a heat-activatable adhesive resin layer, wherein the resin is a polymer of one or more olefinic monomers,
   (b) $N_2$ corona treating a first major surface of said heat-activatable adhesive resin layer, and
   (c) applying a layer of an acrylic-type pressure-sensitive adhesive onto the $N_2$ corona treated surface of said heat-activatable adhesive resin layer,
   wherein said pressure sensitive adhesive layer is permanently and directly bonded to the first major surface of said heat-activatable adhesive layer.

16. The method of claim 15, wherein step (c) comprises applying a layer of a radiation-curable acrylic composition onto said $N_2$ corona treated surface and radiation-curing the composition in situ.

17. The method of claim 15, wherein step (c) comprises laminating a preformed layer of acrylic pressure-sensitive adhesive onto the $N_2$ corona treated surface.

18. An intermediate article comprising the heat-activatable adhesive resin layer (A) as described in claim 1 releasably bonded to a support layer.

19. A vehicle comprising the composite article of claim 14.

20. A vehicle according to claim 19 wherein said vehicle is a motor vehicle.

21. The tape of claim 1, wherein a weatherstrip is bonded to a second major surface of said heat-activatable adhesive layer.

22. The tape of claim 21, wherein said weatherstrip is manufactured from at least one of ethylene-propylene-diene monomer and neoprene.

23. The tape of claim 21, wherein said weatherstrip is manufactured from a low surface energy elastomer.

24. The tape of claim 1, wherein an automotive weatherstrip is bonded to a second major surface of said heat-activatable adhesive layer.

25. The tape of claim 24, wherein said automotive weatherstrip is manufactured from at least one of ethylene-propylene-diene monomer and neoprene.

26. The tape of claim 24, wherein said automotive weatherstrip is manufactured from a low surface energy elastomer.

27. The tape of claim 1, wherein said pressure-sensitive adhesive layer and said heat-activatable layer are permanently bonded together such that the bond between said pressure-sensitive adhesive layer and said heat-activatable layer is greater than the internal strength of said pressure sensitive adhesive layer itself.

* * * * *

UNITED STATES PATENT AND TRADEMARK OFFICE
CERTIFICATE OF CORRECTION

PATENT NO.        : 7,217,455 B2                                    Page 1 of 1
APPLICATION NO. : 10/477567
DATED             : May 15, 2007
INVENTOR(S)       : Benito Valdez It is certified that error appears in the above-identified patent and that said Letters Patent is hereby corrected as shown below:

First Page Column 2 (Other Publications) – Line 4 - Delete "Degradition" and insert -- Degradation --, therefor.

Column 10 – Line 33 (Approx.) - Delete "(N/MM$^2$)" and insert -- (N/mm$^2$) --, therefor.

Column 10 – Line 45 - Delete "PSTC4" and insert -- PSTC-4 --, therefor.

Column 11 – Line 6 - After "tape," insert -- having --.

Column 11 – Line 22 - Delete "12 m/mm" and insert -- 12 m/min --, therefor.

Column 11 – Line 40 - Delete "900°C." and insert -- 90°C. --, therefor.

Column 15 – Line 1 - Example 9 (Col. 2) (Table 1) - Delete "BIend" and insert -- Blend --, therefor.

Column 17 – Line 35 - In Claim 2, delete "300 mm/mm." and insert -- 300 mm/min. --, therefor.

Column 17 – Line 39 - In Claim 3, delete "18 g/10 mm," and insert -- 18 g/10 min, --, therefor.

Column 17 – Line 40 - In Claim 3, delete "45 N/cm ," and insert -- 45 N/cm$^2$, --, therefor.

Signed and Sealed this

Twenty-fourth Day of July, 2007

JON W. DUDAS
*Director of the United States Patent and Trademark Office*